US011518049B2

(12) United States Patent
Hashizume

(10) Patent No.: US 11,518,049 B2
(45) Date of Patent: Dec. 6, 2022

(54) ROTARY MODULE AND ROBOT

(71) Applicant: SEIKO EPSON CORPORATION, Tokyo (JP)

(72) Inventor: Keitaro Hashizume, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 309 days.

(21) Appl. No.: 16/997,965

(22) Filed: Aug. 20, 2020

(65) Prior Publication Data

US 2021/0053237 A1  Feb. 25, 2021

(30) Foreign Application Priority Data

Aug. 22, 2019 (JP) .............................. JP2019-151834
Mar. 31, 2020 (JP) .............................. JP2020-062273

(51) Int. Cl.
| | | |
|---|---|---|
| *B25J 19/00* | (2006.01) | |
| *H01R 39/64* | (2006.01) | |
| *B25J 9/04* | (2006.01) | |
| *H01R 39/08* | (2006.01) | |

(52) U.S. Cl.
CPC ....... *B25J 19/0041* (2013.01); *B25J 19/0029* (2013.01); *H01R 39/64* (2013.01); *B25J 9/047* (2013.01); *H01R 39/08* (2013.01)

(58) Field of Classification Search
CPC ........ H01R 39/64; H01R 39/08; H01R 39/12; H01R 39/14; H01R 39/36; B25J 19/0041; B25J 19/0029; B25J 9/047
See application file for complete search history.

(56) References Cited

U.S. PATENT DOCUMENTS 4,544,215 A * 10/1985 Fritsch ................... H01R 39/38
310/239
2013/0143425 A1 * 6/2013 Smrke ................ H01R 13/5213
439/136

FOREIGN PATENT DOCUMENTS

| EP | 1099520 A1 * | 5/2001 | ............. B25J 15/04 |
| JP | H05138580 A * | 6/1993 | .......... B25J 19/0041 |
| JP | 2004195650 A | 7/2004 | |
| JP | 2014181782 A | 9/2014 | |

OTHER PUBLICATIONS

JP H05138580A Machine Translation (Year: 2022).*

* cited by examiner

Primary Examiner — Oscar C Jimenez
Assistant Examiner — Paul D Baillargeon
(74) Attorney, Agent, or Firm — Yu Gang

(57) ABSTRACT

A rotary module includes a first outer tube, a first member in which a function of the channel is maintained when a first outer tube rotates relative to a first inner tube, the channel coupling an outside of the first outer tube and an inside of the first inner tube, and a second member in which electrical coupling between the first terminal provided on an inner circumference surface of a second outer tube and the second terminal provided on an outer circumference surface of a second inner tube is maintained when the second outer tube rotates relative to the second inner tube, wherein the first outer tube and the second outer tube are fixed, the first inner tube and the second inner tube are fixed, and the first member and the second member are arranged along the same axis as each other.

8 Claims, 10 Drawing Sheets

ROTARY MODULE AND ROBOT

The present application is based on, and claims priority from JP Application Serial Numbers 2019-151834, filed Aug. 22, 2019, and 2020-062273, filed March 31, the disclosure of which is hereby incorporated by reference herein in its entirety.

BACKGROUND

1. Technical Field

The present disclosure relates to a rotary module and robot.

2. Related Art

JP-A-2004-195650 discloses a rotary joint including a substantially cylindrical fixed body attached to an arm side of a welding robot and a substantially cylindrical rotating body attached to a hand side. In the rotary joint, the rotating body is rotatably coupled and supported at an angle of 360° or more relative to the fixed body. Further, a swivel joint for delivering and receiving water and air as fluids is provided between a boss portion of the fixed body and a shaft portion of the rotating body. On the other hand, an electrical signal slip ring including a cylindrical housing and a ring plate electrode is provided in the outer circumference of the boss portion of the fixed body. Therefore, in JP-A-2004-195650, the swivel joint and the electrical signal slip ring are coaxially placed.

However, when the swivel joint and the electrical signal slip ring are coaxially placed, the outer diameter of the rotary joint is larger. Then, when the rotary joint is attached to a robot arm, it is harder to reduce the outer diameter of the robot arm.

SUMMARY

A rotary module according to an application example of the present disclosure includes a first outer tube, a first inner tube provided inside of the first outer tube and rotating relative to the first outer tube, a channel passing through between the first outer tube and the first inner tube and coupling an outside of the first outer tube and an inside of the first inner tube, a first member in which a function of the channel is maintained when the first outer tube rotates relative to the first inner tube, a second outer tube, a second inner tube provided inside of the second outer tube and rotating relative to the second outer tube, a first terminal provided on an inner circumference surface of the second outer tube, a second terminal provided on an outer circumference surface of the second inner tube, and a second member in which electrical coupling between the first terminal and the second terminal is maintained when the second outer tube rotates relative to the second inner tube, wherein the first outer tube and the second outer tube are fixed, the first inner tube and the second inner tube are fixed, and the first member and the second member are arranged along the same axis as each other.

DESCRIPTION OF EXEMPLARY EMBODIMENTS

As below, preferred embodiments of a rotary module and robot according to the present disclosure will be explained in detail with reference to the accompanying drawings.

1. First Embodiment

First, the first embodiment is explained.

Figure 1:
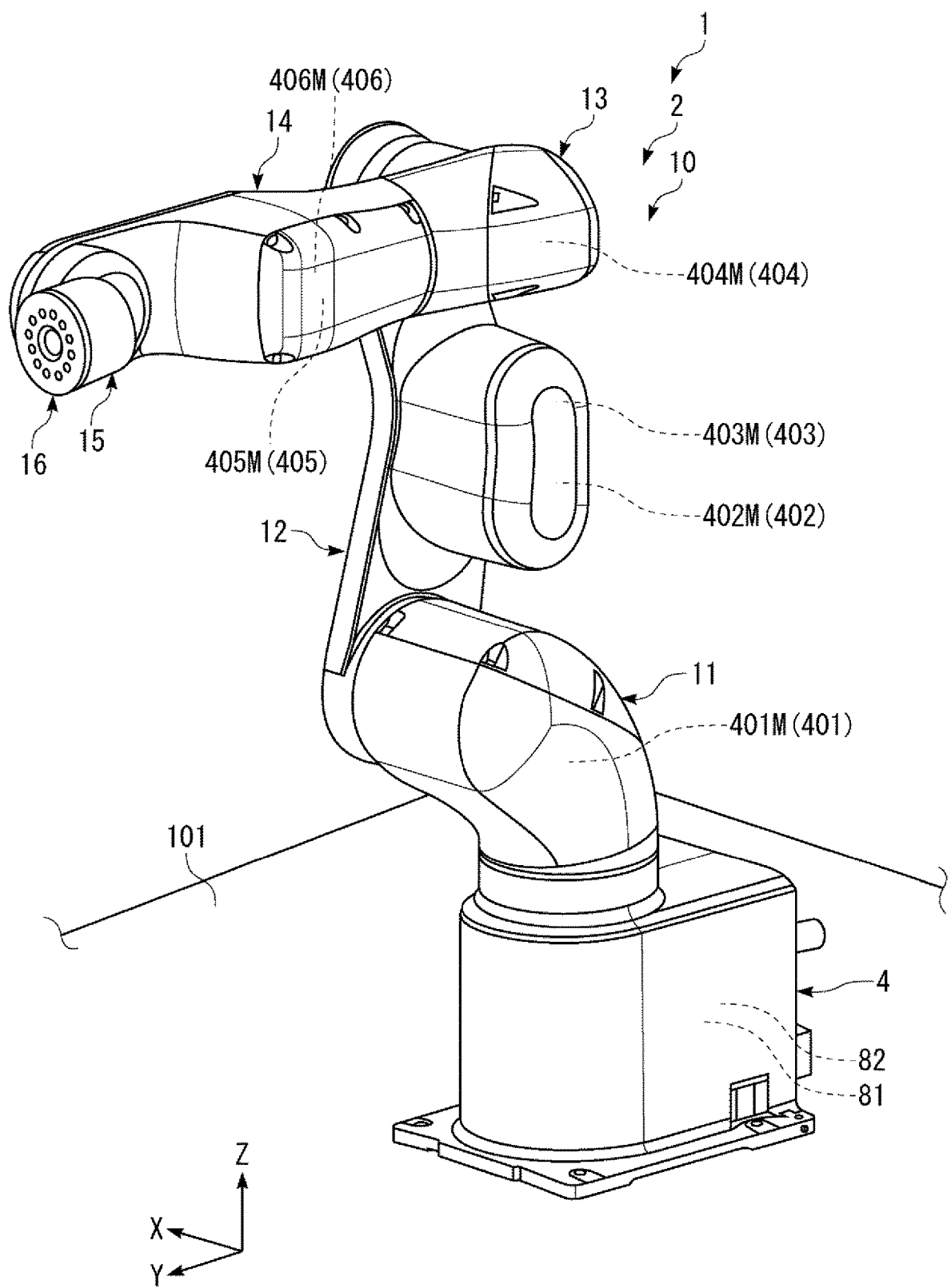
FIG. 1 is a perspective view showing a robot according to a first embodiment.
Figure 2:
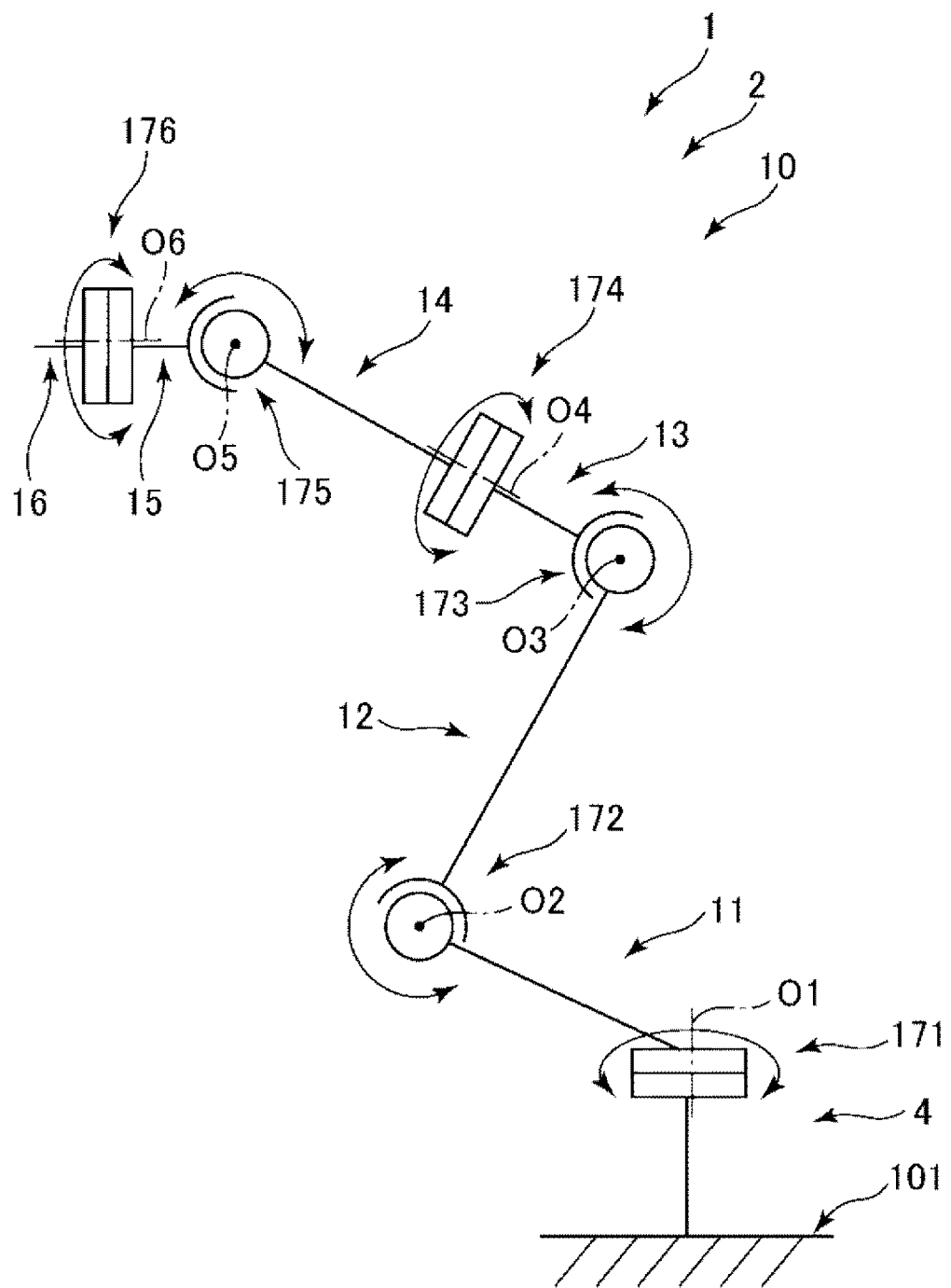
FIG. 2 is a schematic diagram of the robot shown in FIG. 1.
Figure 3:
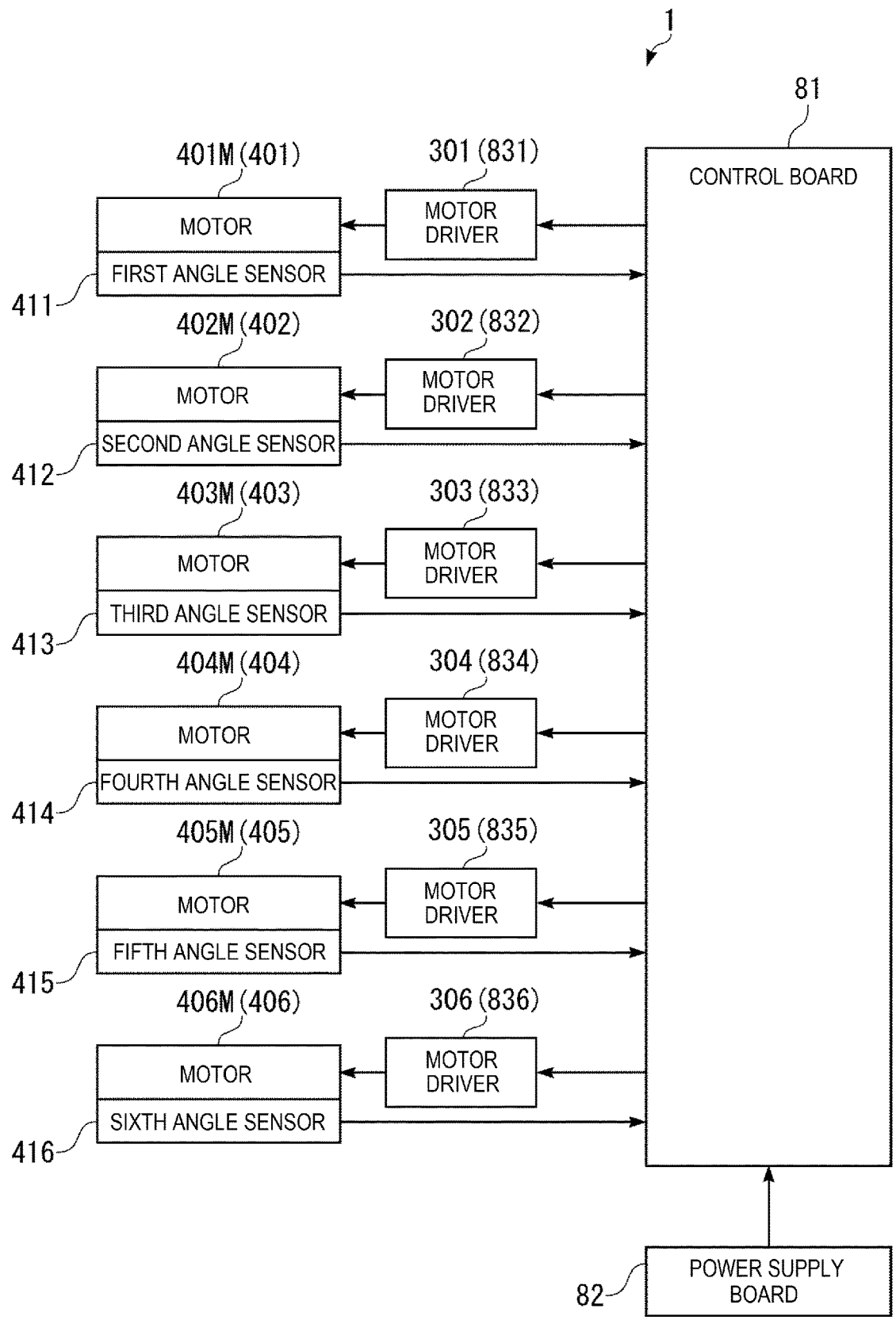
FIG. 3 is a block diagram showing a main part of the robot shown in FIG. 1.

FIG. 1 is the perspective view showing the robot according to the first embodiment. FIG. 2 is the schematic diagram of the robot shown in FIG. 1. FIG. 3 is the block diagram showing the main part of the robot shown in FIG. 1.

Note that, in the respective drawings, an X-axis, a Y-axis, and a Z-axis are set as three axes orthogonal to one another. The head sides of the arrows indicating the respective axes are referred to as "+ (plus) sides" and the tail sides are referred to as "− (minus) sides". The Z-axis is a vertical axis and the X-Y plane is a horizontal plane.

In this specification, "parallel" includes not only the case where two lines or surfaces are completely parallel to each other but also cases with shift within ±5°. Further, in the specification, "orthogonal" includes not only the case where two lines or surfaces are completely orthogonal to each other but also cases with shift within ±5°.

1.1. Robot

A robot 1 shown in FIG. 1 is used for respective work of e.g. transport, assembly, inspection, etc. of various works (objects).

As shown in FIGS. 1 to 3, the robot 1 includes a robot main body 2 having a base 4 and a robot arm 10 displaceably coupled to the base 4, a first drive mechanism 401, a second drive mechanism 402, a third drive mechanism 403, a fourth drive mechanism 404, a fifth drive mechanism 405, and a sixth drive mechanism 406, a control board 81, a power supply board 82, and drive boards 831, 832, 833, 834, 835, 836.

The robot arm 10 includes a first arm 11, a second arm 12, a third arm 13, a fourth arm 14, a fifth arm 15, and a sixth arm 16. The fifth arm 15 and the sixth arm 16 form "wrist". For example, an end effector such as a hand (not shown) may be detachably attached to the distal end of the sixth arm 16 and an object may be gripped by the end effector. The object gripped by the end effector or the like is not particularly limited to, but includes various objects including electronic components and electronic apparatuses. Note that, in this specification, the base 4 side with reference to the sixth arm 16 is referred to as "proximal end side" and the sixth arm 16 side with reference to the base 4 is referred to as "distal end side".

The end effector is not particularly limited to, but includes a hand for gripping an object and a suction head for suctioning an object.

Note that a force detection unit (not shown) may be provided between the sixth arm 16 and the end effector. The force detection unit detects a force applied to the end effector. The force detection unit includes e.g. a six-axis force sensor that can detect force components in the respective axial directions of three axes orthogonal to one another (translational force components) and force components about the respective three axes (rotational force components).

The robot 1 is a single-arm six-axis articulated robot in which the base 4, the first arm 11, the second arm 12, the third arm 13, the fourth arm 14, the fifth arm 15, and the sixth arm 16 are sequentially coupled from the proximal end side toward the distal end side. Hereinafter, the first arm 11, the second arm 12, the third arm 13, the fourth arm 14, the fifth arm 15, and the sixth arm 16 may be respectively referred to as "arm". Further, the first drive mechanism 401, the second drive mechanism 402, the third drive mechanism 403, the fourth drive mechanism 404, the fifth drive mechanism 405, and the sixth drive mechanism 406 may be respectively referred to as "drive mechanism". Note that the lengths of the arms 11 to 16 are not particularly limited, but can be appropriately set.

The base 4 and the first arm 11 are coupled via a joint 171. The first arm 11 is pivotable about a first pivot axis O1 parallel to the vertical axis as a pivot center relative to the base 4. The first pivot axis O1 coincides with the normal of a floor 101 as an installation surface of the base 4. The first arm 11 pivots when being driven by the first drive mechanism 401 having a motor 401M and a reducer (not shown). The motor 401M is an example of a drive source that generates a drive force for pivoting the first arm 11. Further, the motor 401M is controlled by the control board 81 via a motor driver 301.

The first arm 11 and the second arm 12 are coupled via a joint 172. The second arm 12 is pivotable about a second pivot axis O2 parallel to the horizontal plane as a pivot center relative to the first arm 11. The second arm 12 is cantilevered in the distal end portion of the first arm 11. Further, the second arm 12 pivots when being driven by the second drive mechanism 402 having a motor 402M and a reducer (not shown). The motor 402M is an example of a drive source that generates a drive force for pivoting the second arm 12. The motor 402M is controlled by the control board 81 via a motor driver 302.

The second arm 12 and the third arm 13 are coupled via a joint 173. The third arm 13 is pivotable about a third pivot axis O3 parallel to the horizontal plane as a pivot center relative to the second arm 12. The third arm 13 is cantilevered in the distal end portion of the second arm 12. Further, the third arm 13 pivots when being driven by the third drive mechanism 403 having a motor 403M and a reducer (not shown). The motor 403M is an example of a drive source that generates a drive force for pivoting the third arm 13. The motor 403M is controlled by the control board 81 via a motor driver 303.

The third arm 13 and the fourth arm 14 are coupled via a joint 174. The fourth arm 14 is pivotable about a fourth pivot axis O4 parallel to the center axis of the third arm 13 as a pivot center relative to the third arm 13. The fourth pivot axis O4 is orthogonal to the third pivot axis O3. The fourth arm 14 pivots when being driven by the fourth drive mechanism 404 having a motor 404M and a reducer (not shown). The motor 404M is an example of a drive source that generates a drive force for pivoting the fourth arm 14. The motor 404M is controlled by the control board 81 via a motor driver 304.

The fourth arm 14 and the fifth arm 15 are coupled via a joint 175. The fifth arm 15 is pivotable about a fifth pivot axis O5 orthogonal to the center axis of the fourth arm 14 as a pivot center relative to the fourth arm 14. The fifth pivot axis O5 is orthogonal to the fourth pivot axis O4. The fifth arm 15 is cantilevered in the distal end portion of the fourth arm 14. The fifth arm 15 pivots when being driven by the fifth drive mechanism 405 having a motor 405M and a reducer (not shown). The motor 405M is an example of a drive source that generates a drive force for pivoting the fifth arm 15. The motor 405M is controlled by the control board 81 via a motor driver 305.

The fifth arm 15 and the sixth arm 16 are coupled via a joint 176. The sixth arm 16 is pivotable about a sixth pivot axis O6 parallel to the center axis of a second portion 152, which will be described later, of the fifth arm 15 as a pivot center relative to the fifth arm 15. The sixth pivot axis O6 is orthogonal to the fifth pivot axis O5. The sixth arm 16 pivots when being driven by the sixth drive mechanism 406 having a motor 406M and a reducer (not shown). The motor 406M is an example of a drive source that generates a drive force for pivoting the sixth arm 16. The motor 406M is controlled by the control board 81 via a motor driver 306.

In the respective motors or reducers of the drive mechanisms 401 to 406, a first angle sensor 411, a second angle sensor 412, a third angle sensor 413, a fourth angle sensor 414, a fifth angle sensor 415, and a sixth angle sensor 416 are provided. As these angle sensors 411 to 416, e.g. various encoders such as rotary encoders may be used. The pivot angles of the output shafts of the motors or reducers of the drive mechanisms 401 to 406 are detected by the angle sensors 411 to 416.

The motors of the drive mechanisms 401 to 406 include e.g. AC servo motors and DC servo motors.

The reducers of the drive mechanisms 401 to 406 include e.g. planet gear reducers and wave reducers having pluralities of gears.

The drive mechanisms 401 to 406 and the angle sensors 411 to 416 are respectively electrically coupled to the control board 81.

The control board 81 independently controls actuation of the drive mechanisms 401 to 406. Specifically, the control board 81 respectively controls actuation conditions e.g. angular velocities, rotation angles, etc. of the drive mechanisms 401 to 406 based on detection results of the angle sensors 411 to 416 and the force detection unit (not shown). This control program may be stored in a memory unit (not shown) of the control board 81.

Next, the fourth arm 14, the fifth arm 15, and the sixth arm 16 will be explained in detail.

Figure 4:
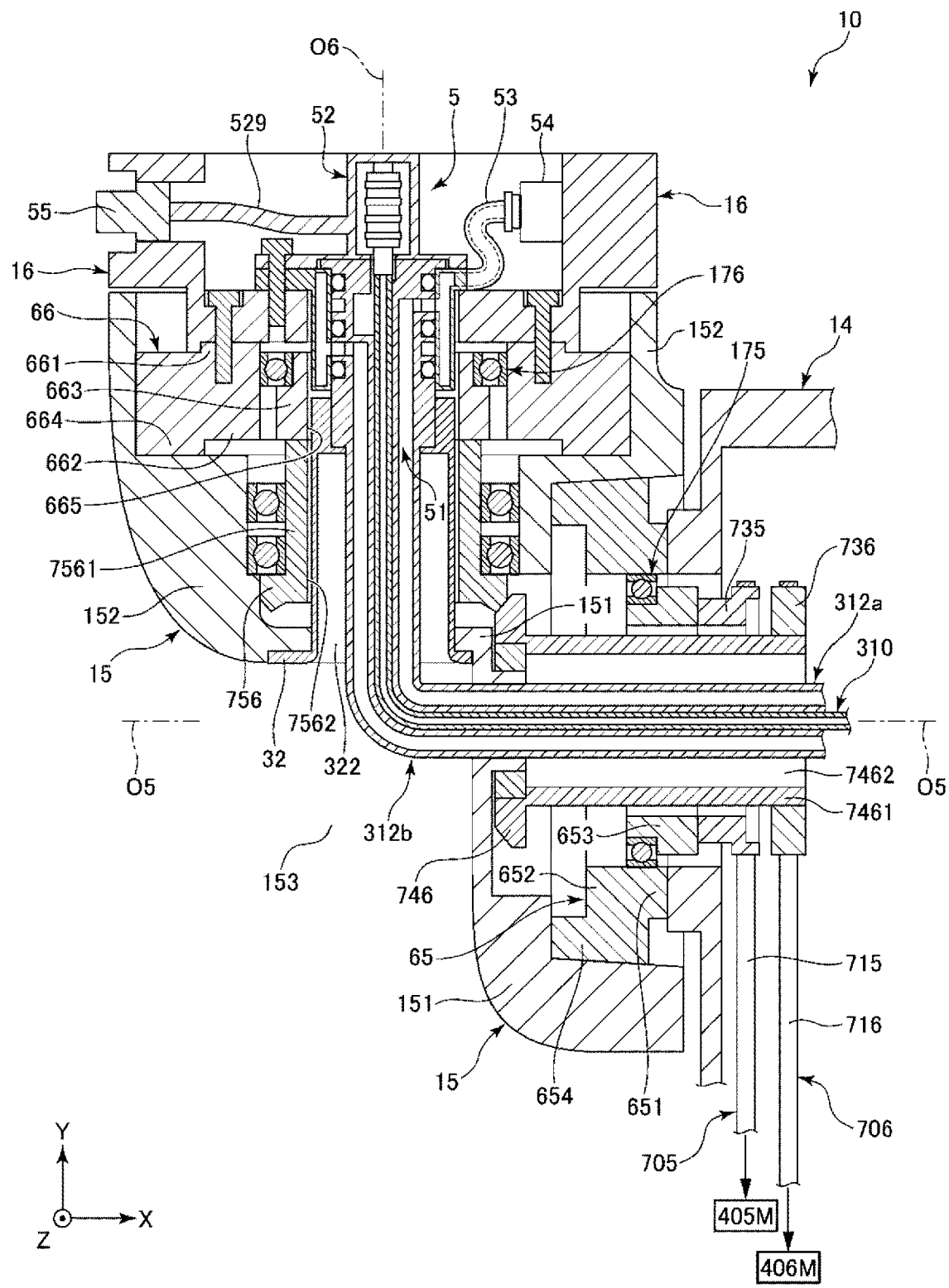
FIG. 4 is a sectional view showing a fourth arm, a fifth arm, and a sixth arm of the robot shown in FIG. 1.

FIG. 4 is the sectional view showing the fourth arm, the fifth arm, and the sixth arm of the robot shown in FIG. 1.

The fourth arm 14 houses the motors 405M, 406M provided outside of the range of FIG. 4.

The fifth arm 15 has a first portion 151 extending in parallel to the fifth pivot axis O5 in a tubular shape and the second portion 152 extending from the first portion 151 in parallel to the sixth pivot axis O6 in a tubular shape. A space 153 is formed between the first portion 151 and the second portion 152.

The sixth arm 16 is the arm at the most distal end of the robot arm 10. The sixth arm 16 is provided at the distal end side of the second portion 152 of the fifth arm 15. Further, the sixth arm 16 is pivotable relative to the fifth arm 15 by the drive force transmitted from the motor 406M via the inside of the fifth arm 15.

The fifth drive mechanism 405 has the motor 405M provided outside of the range of FIG. 4, the reducer 65, and a transmission mechanism 705 that transmits the drive force of the motor 405M to the input shaft of the reducer 65. The transmission mechanism 705 is provided inside of the robot arm 10. Specifically, the motor 405M is provided inside of the fourth arm 14 and the reducer 65 is provided inside of the joint 175 coupling the fourth arm 14 and the fifth arm 15.

The transmission mechanism 705 has a belt 715 and a pulley 735.

The belt 715 is coupled to the output shaft of the motor 405M. The belt 715 is an endless belt and looped over the output shaft of the motor 405M and the pulley 735. The pulley 735 is coupled to the input shaft of the reducer 65.

The reducer 65 shown in FIG. 4 is a wave reducer and has a rigid gear 651, a flexible gear 652, a wave generator 653, and a cross roller bearing 654.

The flexible gear 652 as the output shaft of the reducer 65 is coupled to the fifth arm 15. The rotation of the motor 405M is transmitted to the wave generator 653 as the input shaft of the reducer 65 via the belt 715 and the pulley 735. The reducer 65 reduces and transmits the rotation speed to the fifth arm 15 via the flexible gear 652 as the output shaft. The rigid gear 651 is fixed to the first portion 151 of the fifth arm 15 via the cross roller bearing 654.

The sixth drive mechanism 406 has the motor 406M provided outside of the range of FIG. 4, the reducer 66, and a transmission mechanism 706 that transmits the drive force of the motor 406M to the input shaft of the reducer 66. The transmission mechanism 706 is provided inside of the robot arm 10. Specifically, the motor 406M is provided inside of the fourth arm 14 and the reducer 66 is provided inside of the joint 176 coupling the fifth arm 15 and the sixth arm 16.

The transmission mechanism 706 has a belt 716, a pulley 736, and a pair of bevel gears 746, 756 meshing with each other.

The belt 716 is coupled to the output shaft of the motor 406M. The belt 716 is an endless belt and looped over the output shaft of the motor 406M and the pulley 736.

The pulley 736 is coupled to a shaft portion 7461 of the bevel gear 746. The bevel gear 746 is provided inside of the first portion 151 of the fifth arm 15. On the other hand, the bevel gear 756 is provided inside of the second portion 152 of the fifth arm 15. A shaft portion 7561 of the bevel gear 756 is coupled to the input shaft of the reducer 66.

The reducer 66 shown in FIG. 4 is a wave reducer and has a rigid gear 661, a flexible gear 662, a wave generator 663, and a cross roller bearing 664.

The flexible gear 662 as the output shaft of the reducer 66 is coupled to the sixth arm 16. The rotation of the motor 406M is transmitted to the bevel gear 746 by the belt 716 and the pulley 736. The rotation of the bevel gear 746 is changed in the direction of the rotation axis by 90° by the bevel gears 746, 756, and transmitted to the wave generator 663 as the input shaft of the reducer 66 coupled to the shaft portion 7561 of the bevel gear 756. The reducer 66 reduces and transmits the rotation speed to the sixth arm 16 via the flexible gear 662 as the output shaft. The rigid gear 661 is fixed to the second portion 152 of the fifth arm 15 via the cross roller bearing 664.

Note that the bevel gears 746, 756 of the transmission mechanism 706 may be replaced by another mechanism having the same function e.g. a mechanism having a worm and a worm wheel or the like.

In the embodiment, the wave reducers are used as the reducers 65, 66. Thereby, the sizes and weights of the reducers 65, 66 may be reduced and the size and weight of the robot 1 may be reduced.

Here, in the reducer 66 and the sixth arm 16, a through hole 665 extending along the sixth pivot axis O6 is formed. Specifically, through holes extending along the sixth pivot axis O6 are respectively formed in the rigid gear 661, the flexible gear 662, the wave generator 663, and the sixth arm 16, and thereby, the through hole 665 is formed.

In the bevel gear 756, a through hole 7562 extending along the sixth pivot axis O6 is formed. A tubular member 32 is placed to continuously penetrate the through hole 665 and the through hole 7562. That is, the tubular member 32 extends from the sixth arm 16 to the bevel gear 756. The tubular member 32 is fixed to the fifth arm 15 in the end portion at the minus side of the Y-axis. On the other hand, the tubular member 32 is separated from the bevel gear 756. Accordingly, when the bevel gear 756 rotates by the rotation of the motor 406M, the tubular member 32 does not rotate. Then, a wire 310 and pipes 312a, 312b inserted through an internal space 322 of the tubular member 32 may be prevented from being in contact with the rotating bevel gear 756. Therefore, damage of the wire 310 and the pipes 312a, 312b may be suppressed.

As described above, the wire 310 and the pipes 312a, 312b are inserted through the internal space 322 of the tubular member 32 shown in FIG. 4. The wire 310 and the pipes 312a, 312b are inserted through the through hole 665 and the internal space 322 of the tubular member 32. The wire 310 and the pipes 312a, 312b are bent at 90° in the space 153.

Further, in the bevel gear 746, a through hole 7462 extending along the fifth pivot axis O5 is formed. The wire 310 and the pipes 312a, 312b inserted through the through hole 665 are also inserted through the through hole 7462.

As described above, the wire 310 and the pipes 312a, 312b are inserted through the through hole 7462 via the through hole 665, the internal space 322, and the space 153. Then, the wire 310 and the pipes 312a, 312b are routed through the fourth arm 14, the third arm 13, the second arm 12, and the first arm 11 to the base 4 (not shown).

The wire 310 includes e.g. a power line or communication line coupling the end effector attached to the distal end of the sixth arm 16 and the control board 81, a power line or communication line coupling the respective drive mechanisms 401 to 406 and the control board 81, and a power line or communication line coupling another accessory like a force detection unit such as a sensor belonging to the robot 1 and the control board 81. Note that, for the wire 310, e.g. a coated wire formed by coating of a conductor with an insulating material is used, however, a wire bundle having a tube and one or more coated wires inserted through the tube may be used.

The pipes 312a, 312b include e.g. pipes for air intake or pipes for compressed air used for actuation of the end effector or the like and pipes for refrigerant. Both of the pipes 312a, 312b may be pipes for air intake or pipes for compressed air or one may be a pipe for air intake and the other may be a pipe for compressed air.

Note that the wire 310 and the pipes 312a, 312b may be branched in the middle. Further, the wire 310 and the pipes 312a, 312b may be partially routed outside of the robot arm 10. Furthermore, the wire 310 and the pipes 312a, 312b may not achieve the base 4, but be routed to the outside in the middle of the robot arm 10.

The number of the wires 310 is not particularly limited, but may be two or more. Similarly, the number of the pipes 312a, 312b is not particularly limited, but may be one, three, or more.

1.2 Rotary Module

Figure 5:
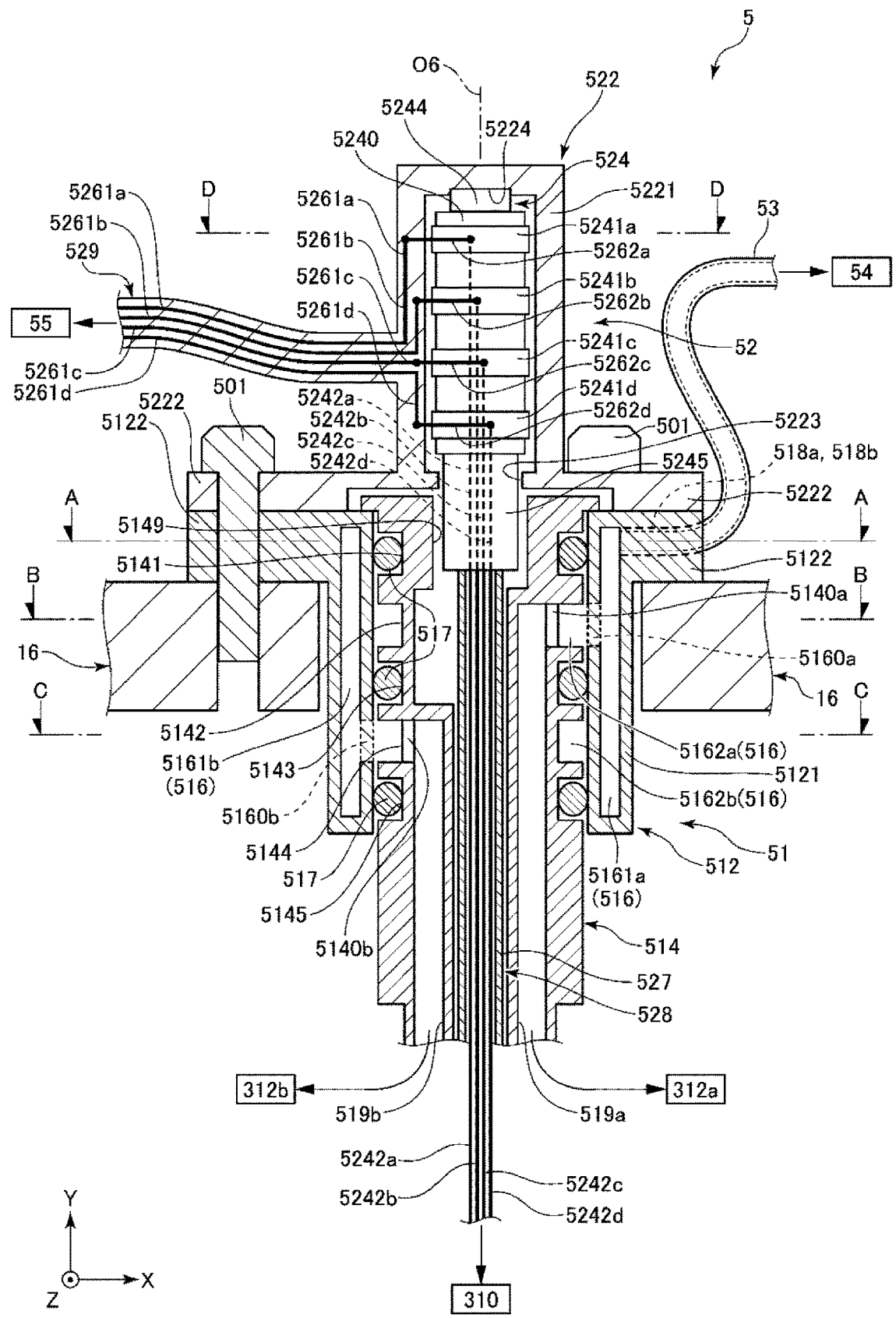
FIG. 5 is a partially enlarged view of FIG. 4.
Figure 6:
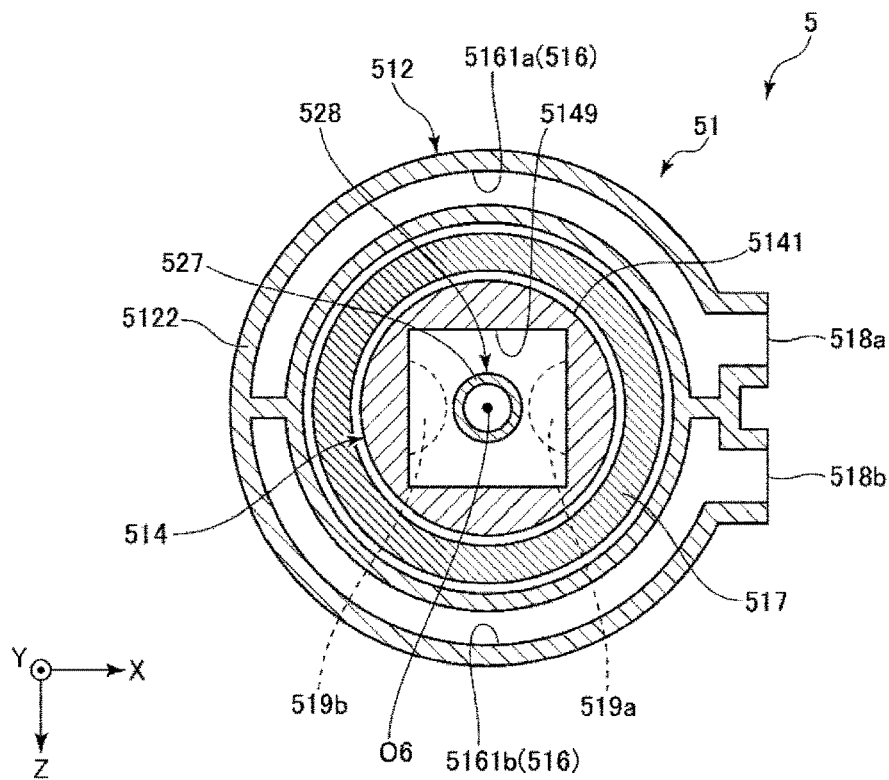
FIG. 6 is a sectional view along line A-A in FIG. 5.
Figure 7:
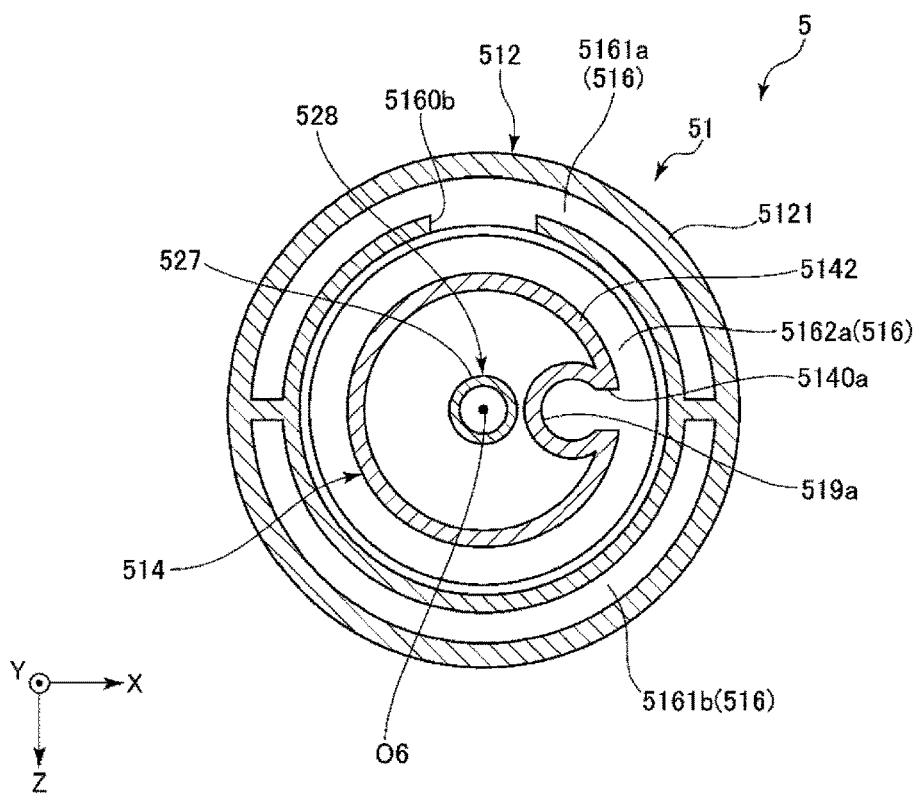
FIG. 7 is a sectional view along line B-B in FIG. 5.
Figure 8:
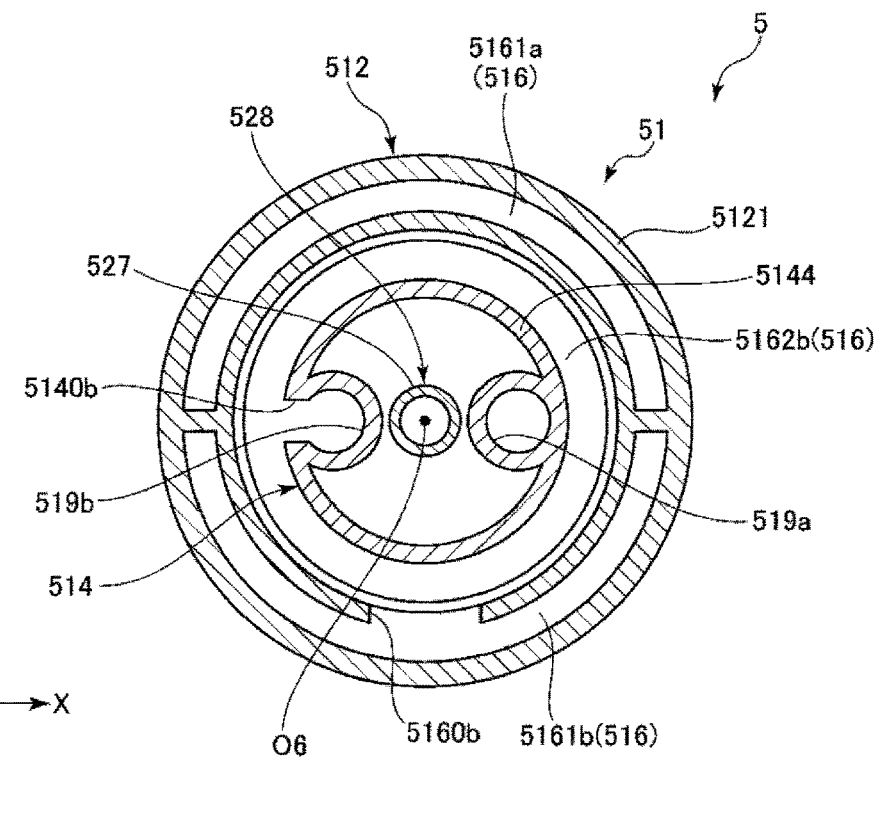
FIG. 8 is a sectional view along line C-C in FIG. 5.

The robot arm 10 shown in FIG. 4 has the rotary module 5. FIG. 5 is the partially enlarged view of FIG. 4. FIG. 6 is the sectional view along line A-A in FIG. 5. FIG. 7 is the sectional view along line B-B in FIG. 5. FIG. 8 is the sectional view along line C-C in FIG. 5.

The rotary module 5 has a first member 51 having an air channel, and a second member 52 having a power or communication wire. The first member 51 and the second member 52 are arranged along the same axis as each other. Specifically, as shown in FIG. 5, the first member 51 and the second member 52 are arranged along the sixth pivot axis O6 as the same axis as each other.

Accordingly, increase of the outer diameter of the rotary module 5 having the first member 51 and the second member 52 may be suppressed compared to that of the related art. Thereby, as shown in FIG. 4, a part of the rotary module 5 can be placed inside of the reducer 66. As a result, the space may be effectively used and the outer diameter of the robot arm 10 may be reduced.

Note that, in FIGS. 6 to 8, for convenience of illustration, only the first member 51 is shown.

1.2.1 First Member

The first member 51 is the so-called air rotary joint in a tubular shape and includes a first outer tube 512, a first inner tube 514, and a channel 516.

As shown in FIG. 5, the first outer tube 512 has a tubular shape and extends along the sixth pivot axis O6 (Y-axis). The first outer tube 512 includes a smaller diameter portion 5121 having a smaller outer diameter and a larger diameter portion 5122 having a larger outer diameter than the smaller diameter portion 5121. Further, the first outer tube 512 includes two routes of outer tubular channels 5161a, 5161b provided within a side wall thereof as a part of the channel 516. As shown in FIGS. 6 to 8, the outer tubular channels 5161a, 5161b are respectively formed in a range of nearly a half of the circumference of the first outer tube 512 having the tubular shape. The outer tubular channels 5161a, 5161b are partitioned by partition walls. As shown in FIG. 5, the outer tubular channels 5161a, 5161b are formed substantially in the entire of the whole length of the first outer tube 512 along the sixth pivot axis O6.

The first inner tube 514 is provided inside of the first outer tube 512. A gap is provided between the first outer tube 512 and the first inner tube 514 and the tubes are rotatable relative to each other around the sixth pivot axis O6 as a rotation axis.

As shown in FIG. 5, the first inner tube 514 has a tubular shape and the length along the sixth pivot axis O6 is longer than that of the first outer tube 512. Of the first inner tube 514, the end portion at the minus side of the Y-axis is fitted in the tubular member 32 as shown in FIG. 4. Thereby, the first inner tube 514 is integrally rotatably coupled with the tubular member 32.

The first inner tube 514 includes five grooves 5141 to 5145 provided in the outer circumference surface. The five grooves 5141 to 5145 have annular shapes around the sixth pivot axis O6 and are sequentially arranged from the plus side of the Y-axis along the sixth pivot axis O6. Note that the number of the grooves is not particularly limited to five, but may be four or less or sixth or more.

As described above, the first inner tube 514 is provided inside of the first outer tube 512, and the openings of the five grooves 5141 to 5145 are respectively covered by the inner surface of the first outer tube 512. Accordingly, the interiors of the five grooves 5141 to 5145 are nearly enclosed space.

In the grooves 5141, 5143, 5145, O-rings 517 as seal rings are respectively fitted. The O-rings 517 air-tightly seal between the grooves 5141, 5143, 5145 and the first outer tube 512. Accordingly, the groove 5142 between the grooves 5141, 5143 is surrounded by the first outer tube 512 and the two O-rings 517. As a result, the groove 5142 forms an inner tubular channel 5162a having air-tightness as a part of the channel 516. Similarly, the groove 5144 between the grooves 5143, 5145 is surrounded by the first outer tube 512 and the two O-rings 517. As a result, the groove 5144 forms an inner tubular channel 5162b having air-tightness as a part of the channel 516.

Therefore, the first member 51 shown in FIGS. 5 to 8 includes the two routes of inner tubular channels 5162a, 5162b between the first outer tube 512 and the first inner tube 514.

Further, the first member 51 includes internal pipes 519a, 519b inserted through the first inner tube 514. The end portion of the internal pipe 519a at the plus side of the Y-axis is coupled to the inner tubular channel 5162a via a window portion 5140a located in the position of the groove 5142 and penetrating the side wall of the first inner tube 514. The end portion of the internal pipe 519b at the plus side of the Y-axis is coupled to the inner tubular channel 5162b via a window portion 5140b located in the position of the groove 5144 and penetrating the side wall of the first inner tube 514. Note that the number of internal pipes of the first member 51 is not limited to two, but may be one, three, or more.

On the other hand, the above described first outer tube 512 includes a window portion 5160a coupling the inside thereof and the outer tubular channel 5161a. The outer tubular channel 5161a is coupled to the inner tubular channel 5162a via the window portion 5160a. Further, the above described first outer tube 512 includes a window portion 5160b coupling the inside thereof and the outer tubular channel 5161b. The outer tubular channel 5161b is coupled to the inner tubular channel 5162b via the window portion 5160b.

Note that the broken lines showing the window portions 5160a, 5160b in FIG. 5 show that the window portions are located in positions apart from the section shown in FIG. 5.

Here, FIGS. 4 and 5 respectively correspond to the sectional views cut along the X-Y plane of FIGS. 6 to 8, but, for convenience of explanation, partially correspond to the sectional views cut along a plane formed by rotation of the X-Y plane about the Y-axis for showing the inner tubular channels 5162a, 5162b, the window portions 5140a, 5140b and the internal pipes 519a, 519b within the same figures.

The first member 51 includes coupling ports 518a, 518b. As shown in FIG. 6, the coupling ports 518a, 518b are respectively provided in the outer circumference surface of the first outer tube 512. The coupling port 518a is coupled to the outer tubular channel 5161a and the coupling port 518b is coupled to the outer tubular channel 5161b.

Those coupling ports 518a, 518b are provided, and thereby, for example, the outer tubular channels 5161a, 5161b used as air channels may be coupled to a coupling pipe 53 for end effector and sensor as shown in FIG. 5. Further, attachment and detachment mechanisms are added to the coupling ports 518a, 518b, and thereby, assembly work and disassembly work may be easily performed. The positions of the coupling ports 518a, 518b in the first member 51 are not particularly limited, but the coupling ports are located in the larger diameter portion 5122 in FIG. 5. Note that the broken lines showing the coupling ports 518a, 518b in FIG. 5 show that the coupling ports are located apart from the section shown in FIG. 5.

A joint 54 to which the coupling pipe 53 is coupled is fixed to the sixth arm 16. The joint 54 draws the channel of the coupling pipe 53 out of the sixth arm 16. The joint 54 is provided, and thereby, coupling work between an external device such as an end effector and the coupling pipe 53 may be easily performed.

As described above, in the first member 51, the internal pipe 519a and the coupling port 518a are coupled via the channel 516 formed by the outer tubular channel 5161a, the window portion 5160a, the inner tubular channel 5162a, and the window portion 5140a. Thereby, air or various gases may be circulated from the coupling port 518a side to the internal pipe 519a side or in the opposite direction thereto. Further, the internal pipe 519b and the coupling port 518b are coupled via the channel 516 formed by the outer tubular channel 5161b, the window portion 5160b, the inner tubular channel 5162b, and the window portion 5140b. Thereby, air or various gases may be circulated from the coupling port 518b side to the internal pipe 519b side or in the opposite direction thereto.

Here, in the first member 51, the first inner tube 514 is rotatable relative to the first outer tube 512. "Rotatable relative to" refers to a state in which the first outer tube 512 is fixed and the first inner tube 514 is rotatable or a state in which the first inner tube 514 is fixed and the first outer tube 512 is rotatable, and the embodiment is the latter state.

In the embodiment, the first inner tube 514 is fixed to the fifth arm 15 via the tubular member 32 shown in FIG. 4. As shown in FIG. 5, the first outer tube 512 is fixed to the sixth arm 16. When the sixth arm 16 is rotated relative to the fifth arm 15, the first outer tube 512 rotates relative to the first inner tube 514 and the channel 516 is not interrupted, but the function thereof is maintained. Specifically, the inner tubular channels 5162a, 5162b respectively have the annular shapes around the outer surface of the first inner tube 514, and thereby, the window portions 5160a, 5160b formed in the parts of the outer tubular channels 5161a, 5161b are constantly coupled to the inner tubular channels 5162a, 5162b. Therefore, the sixth arm 16 can be driven with the continued circulation of the air or the like in the channel 516.

The function of the channel 516, i.e., the function of circulating the gas is maintained regardless of the rotation angle of the first outer tube 512 relative to the first inner tube 514. Accordingly, the sixth arm 16 may be rotated relative to the fifth arm 15 without restriction of the rotation angle, i.e., substantially infinitely.

The O-rings 517 are fitted in the grooves 5141, 5143, 5145 between the first inner tube 514 and the first outer tube 512 and slide relative to the first outer tube 512. Therefore, the pressed and deformed O-rings 517 slide relative to the first outer tube 512 and the air-tightness of the channel 516 is secured.

In the viewpoint, it is preferable that the constituent material of the first outer tube 512 is a material having high slidability for the seal rings including the O-rings 517. Specifically, the constituent material of the first outer tube 512 includes various resin materials such as polyacetal resin (POM), fluorine resin, polyamide resin, polyphenylene sulfide resin, and polyimide resin, and metal materials, ceramics materials, etc. Of the materials, the resin materials are preferably used and the polyacetal resin is more preferably used.

Also, the resin material for the first inner tube 514 is appropriately selected from the materials cited as the resin materials of the first outer tube 512.

The O-rings 517 can be replaced by any other seal rings having high slidability for the first outer tube 512.

Note that, as described above, the first member 51 includes the internal pipes 519a, 519b inserted through the first inner tube 514. The internal pipes 519a, 519b and the above described channel 516 are coupled.

According to the configuration, the space produced within the rotary module 5 can be used as a housing space for the internal pipes 519a, 519b. That is, the space inside of the reducer 66 may be effectively used as the housing space without increase of the diameter of the reducer 66. Further, the internal pipes 519a, 519b located inside of the reducer 66 may be drawn to the outside of the reducer 66. Thereby, the housing space for the internal pipes 519a, 519b may be saved and increase of the diameter of the rotary module 5 may be suppressed.

Note that the end portion of the internal pipe 519a at the minus side of the Y-axis is coupled to the above described pipe 312a and the end portion of the internal pipe 519b at the minus side of the Y-axis is coupled to the above described pipe 312b. Thereby, the above described internal pipes 519a, 519b may be coupled to the pipes 312a, 312b laid at the proximal end side of the sixth arm 16. Joints or the like may be used for the coupling portions as appropriate.

1.2.2 Second Member

The second member 52 is the so-called slip ring having a tubular shape and includes a second outer tube 522, a second inner tube 524, first terminals 5262a, 5262b, 5262c, 5262d, and second terminals 5241a, 5241b, 5241c, 5241d.

As shown in FIG. 5, the second outer tube 522 has a tubular shape and extends along the sixth pivot axis O6 (Y-axis). The second outer tube 522 includes a smaller diameter portion 5221 having a smaller outer diameter and a larger diameter portion 5222 having a larger outer diameter than the smaller diameter portion 5221. Further, the second outer tube 522 includes four routes of outer tube wires 5261a, 5261b, 5261c, 5261d provided within a side wall thereof. These outer tube wires 5261a, 5261b, 5261c, 5261d are drawn out of the second outer tube 522 and routed to an input/output connector 55 shown in FIG. 4.

The second outer tube 522 has an opening portion 5223 open toward the minus side of the Y-axis. Through the opening portion 5223, a connector portion 5245 coupled to the second inner tube 524, which will be described later, is inserted. Further, a recessed portion 5224 recessed toward the plus side of the Y-axis is formed in the inner wall at the opposite side to the opening portion 5223 of the second outer tube 522.

The second member 52 includes the four first terminals 5262a, 5262b, 5262c, 5262d provided in the inner circumference portion to project. The first terminals 5262a, 5262b, 5262c, 5262d are placed at equal intervals along the sixth pivot axis O6. The first terminals 5262a, 5262b, 5262c, 5262d will be described later.

The second inner tube 524 is provided inside of the second outer tube 522. A gap is provided between the second outer tube 522 and the second inner tube 524 and the tubes are rotatable relative to each other around the sixth pivot axis O6 as a rotation axis.

As shown in FIG. 5, the second inner tube 524 has a tubular shape. Of the second inner tube 524, the connector portion 5245 as the end portion at the minus side of the Y-axis, which will be described later, is fitted in an opening portion 5149 provided in the end portion of the first inner tube 514 at the plus side of the Y-axis as shown in FIG. 5. Thereby, the second inner tube 524 is integrally rotatably coupled with the first inner tube 514.

The second inner tube 524 includes a cylindrical trunk portion 5240 and the four second terminals 5241a, 5241b, 5241c, 5241d provided on the outer circumference surface of the trunk portion 5240. The second terminals 5241a, 5241b, 5241c, 5241d are placed at equal intervals along the sixth pivot axis O6. Further, the second terminals 5241a, 5241b, 5241c, 5241d respectively have annular shapes around the sixth pivot axis O6.

The second inner tube 524 includes a projecting portion 5244 projecting from the end portion of the trunk portion 5240 at the plus side of the Y-axis and a connector portion 5245 projecting from the end portion of the trunk portion 5240 at the minus side of the Y-axis.

The projecting portion 5244 is inserted into the recessed portion 5224 of the second outer tube 522. Thereby, the recessed portion 5224 functions as a bearing and the recessed portion 5224 rotates relative to the projecting portion 5244.

The connector portion 5245 is inserted through the opening portion 5223 and inserted into the first inner tube 514. The connector portion 5245 includes the four inner tube wires 5242a, 5242b, 5242c, 5242d inside. The inner tube wires 5242a, 5242b, 5242c, 5242d extend into the trunk portion 5240 and are electrically coupled to the second terminals 5241a, 5241b, 5241c, 5241d.

Through the above described first inner tube 514, a coated tube 527 is inserted along the sixth pivot axis O6. The end portion of the coated tube 527 at the plus side of the Y-axis is coupled to the connector portion 5245. The inner tube wires 5242a, 5242b, 5242c, 5242d are inserted through the coated tube 527. Here, the inner tube wires 5242a, 5242b, 5242c, 5242d and the coated tube 527 are collectively referred to as "internal wiring 528". That is, the internal wiring 528 is inserted through the first inner tube 514 along the sixth pivot axis O6. Thereby, when the first member 51 and the second member 52 are arranged along the sixth pivot axis O6, the internal wiring 528 may be provided through the first inner tube 514 and increase of the diameters of the rotary module 5 and the robot arm 10 can be suppressed. The end portion of the internal wiring 528 at the minus side of the Y-axis is coupled to the above described wire 310 via a connector or the like provided as necessary. Note that the configuration of the internal wiring 528 is not limited to that, but e.g. the coated tube 527 may be omitted.

Further, the second member 52 includes an external coupling portion 529 provided in the outer circumference surface of the second outer tube 522. The external coupling portion 529 shown in FIG. 4 is an input/output wire extending from the second outer tube 522 and serves as a coupling portion to the outside. The external coupling portion 529 is electrically coupled to the first terminals 5262a, 5262b, 5262c, 5262d. The external coupling portion 529 is provided, and thereby, the first terminals 5262a, 5262b, 5262c, 5262d may be easily drawn to the outside.

The input/output connector 55 is fixed to the sixth arm 16. The external coupling portion 529 is coupled to the input/output connector 55. The input/output connector 55 is provided, and thereby, e.g. work for coupling the external coupling portion 529 to the end effector, sensor, or the like may be easily performed. That is, the end effector, sensor, or the like may be easily coupled to the control board 81 of the robot 1. Further, for realization of the coupling, the increase of the diameter of the robot arm 10 may be suppressed.

Here, the configuration of the second member 52 is described further in detail.

Figure 9:
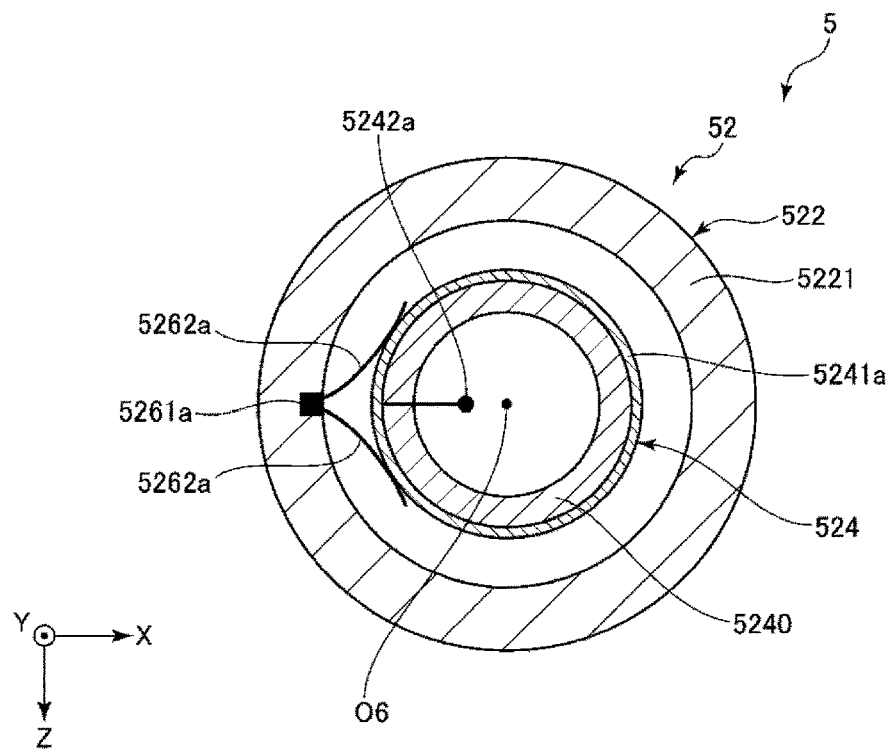
FIG. 9 is a sectional view along line D-D in FIG. 5.

FIG. 9 is the sectional view along line D-D in FIG. 5.

As shown in FIG. 9, the above described first terminals 5262a, 5262b, 5262c, 5262d are respectively formed using two conducting wires. Therefore, the first terminals 5262a, 5262b, 5262c, 5262d function as the so-called brush electrodes. Note that the number of the conducting wires may be one, three, or more.

As below, the first terminal 5262a will be representatively explained. The respective configurations of the terminals 5262b, 5262c, 5262d are the same as the configuration of the first terminal 5262a and the explanation will be omitted.

The first terminal 5262a is provided to project inward from the inner circumference surface of the second outer tube 522. The first terminal 5262a is in contact with the second terminal 5241a provided in the second inner tube 524. The first terminal 5262a has elasticity and the state in which the first terminal contacts the second terminal 5241a and is pressed against the second terminal 5241a, i.e., "contact state" is maintained. Thereby, even when the first terminal 5262a rotates relative to the second terminal 5241a, the contact state may be maintained.

The first terminal 5262a is formed using the two conducting wires and the ends of the conducting wires face the opposite directions to each other. Accordingly, the first terminal 5262a may maintain the contact state regardless of the rotation direction of the second terminal 5241a.

As described above, in the second member 52, the input/output connector 55 and the wire 310 shown in FIG. 4 are electrically coupled via the outer tube wire 5261a, the first terminal 5262a, the second terminal 5241a, and the inner tube wires 5242a. Thereby, for example, power supply and communication may be provided between the control board 81 and the input/output connector 55.

Further, as described above, the second member 52 includes the internal wiring 528 inserted through the second inner tube 524. The internal wiring 528 and the second terminals 5241a, 5241b, 5241c, 5241d are electrically coupled.

According to the configuration, the space produced within the rotary module 5 can be used as a housing space for the internal wiring 528. Thereby, increase of the outer diameter of the rotary module 5 may be suppressed.

Here, in the second member 52, the second inner tube 524 is rotatable relative to the second outer tube 522. "Rotatable relative to" refers to a state in which the second outer tube 522 is fixed and the second inner tube 524 is rotatable or a state in which the second inner tube 524 is fixed and the second outer tube 522 is rotatable, and the embodiment is the latter state.

In the embodiment, the second inner tube 524 is fixed to the first inner tube 514. The second inner tube 524 has a convex portion (not shown) at the minus side of the Y-axis and the first inner tube 514 has a concave portion (not shown) at the plus side of the Y-axis. The convex portion and the concave portion have the same polygonal shape and are fitted, and thereby, the second inner tube 524 can be fixed to the first inner tube 514. Note that "fixed" includes a case where the second inner tube 524 is fixed to the first inner tube 514 including displacement. For example, the second inner tube 524 and the first inner tube 514 may be fixed by fitting of the convex portion and the concave portion with a gap. Thereby, when displacement is produced between the first inner tube 514 and the second inner tube 524, the displacement can be absorbed and removed.

The second outer tube 522 is fixed to the sixth arm 16 with the first outer tube 512. In the embodiment, a method of screwing a bolt 501 penetrating both the larger diameter portion 5222 of the second outer tube 522 and the larger diameter portion 5122 of the first outer tube 512 into the sixth arm 16 is used for the fixation. By the fixation, when the sixth arm 16 is rotated relative to the fifth arm 15, the second outer tube 522 rotates relative to the second inner tube 524 and the above described electrical coupling is maintained. Specifically, the first terminal 5262a maintains the contact state even when rotating relative to the second terminal 5241a. Therefore, the sixth arm 16 can be driven with the maintained electrical coupling.

Further, the electrical coupling is maintained regardless of the rotation angle of the second outer tube 522 relative to the second inner tube 524. Accordingly, the sixth arm 16 may be rotated relative to the fifth arm 15 without restriction of the rotation angle, i.e., substantially infinitely.

Furthermore, as described above, when the sixth arm 16 is rotated, the first outer tube 512 also rotates with the second outer tube 522. Accordingly, the sixth arm 16 can be driven with the continued circulation of the air or the like in the channel 516.

Note that the method of fixing the first outer tube 512 and the second outer tube 522 to the sixth arm 16 is not limited to the above described method. For example, the first outer tube 512 may be fixed to the second outer tube 522, and then, the tubes may be fixed to the sixth arm 16. Or, the second outer tube 522 may be fixed to the first outer tube 512, and then, the tubes may be fixed to the sixth arm 16. Or, an arbitrary member may be provided as a spacer between the first outer tube 512 and the second outer tube 522.

In the above described first embodiment, when the motor 406M rotates, the rotation is first transmitted to the bevel gear 746. As described above, the rotation of the bevel gear 746 is transmitted to the sixth arm 16 via the bevel gear 756 and the reducer 66. Then, in the embodiment, the rotation of the sixth arm 16 is transmitted to the first outer tube 512 and the second outer tube 522 fixed to the sixth arm 16. On the other hand, the first inner tube 514 and the second inner tube 524 are fixed to the fifth arm 15 via the tubular member 32 and do not rotate. In this manner, the rotary module 5 is actuated.

As described above, the rotary module 5 according to the embodiment has the first member 51 and the second member 52 and the first member 51 and the second member 52 are arranged along the same axis as each other.

Further, the first member 51 includes the first outer tube 512, the first inner tube 514 provided inside of the first outer tube 512 and rotating relative to the first outer tube 512, and the channel 516 coupling the outside of the first outer tube 512 and the inside of the first inner tube 514. In the first member 51, when the first outer tube 512 rotates relative to the first inner tube 514, the function of the channel 516 is maintained.

Furthermore, the second member 52 includes the second outer tube 522, the second inner tube 524 provided inside of the second outer tube 522 and rotating relative to the second outer tube 522, the first terminals 5262a, 5262b, 5262c, 5262d provided on the outer circumference surface of the second outer tube 522, and the second terminals 5241a, 5241b, 5241c, 5241d provided on the outer circumference surface of the second inner tube 524. In the second member 52, when the second outer tube 522 rotates relative to the second inner tube 524, the electrical coupling between the first terminals 5262a, 5262b, 5262c, 5262d and the second terminals 5241a, 5241b, 5241c, 5241d is maintained.

The first outer tube 512 and the second outer tube 522 are fixed and the first inner tube 514 and the second inner tube 524 are fixed. Further, the first member 51 and the second member 52 are arranged along the sixth pivot axis O6 as the same axis as each other.

According to the rotary module 5, the first member 51 and the second member 52 are arranged along the sixth pivot axis O6 as the same axis as each other. Accordingly, the increase of the outer diameter of the rotary module 5 may be suppressed compared to that of the related art. Thereby, for example, as shown in FIG. 4, a part of the rotary module 5 can be placed inside of the reducer 66. As a result, the space may be effectively used and the outer diameter of the robot arm 10 may be reduced.

Even when the first inner tube 514 rotates relative to the first outer tube 512, the channel 516 is maintained. Further, even when the second inner tube 524 rotates relative to the second outer tube 522, the electrical coupling may be maintained. Accordingly, the sixth arm 16 may be rotated relative to the fifth arm 15 without restriction of the rotation angle. Thereby, the user-friendly robot 1 may be realized.

The robot 1 according to the embodiment has the rotary module 5 and the robot arm 10. The robot arm 10 includes the fifth arm 15 as the proximal end side arm and the sixth arm 16 as the distal end side arm coupled to the distal end side of the proximal end side arm. The sixth arm 16 is coupled to the first outer tube 512 and the second outer tube 522. The fifth arm 15 is coupled to the first inner tube 514 and the second inner tube 524.

According to the robot 1, the outer diameter of the robot arm 10 may be reduced by the rotary module 5 having the diameter that can be suppressed to be larger. Further, it is not necessary to restrict the rotation angle of the sixth arm 16 relative to the fifth arm 15 without loss of circulation of the air or the like and the electrical coupling. Therefore, the compact and user-friendly robot 1 may be realized.

1.3 Modified Example of Displacement Absorption

Regarding the displacement of the first inner tube 514 and the second inner tube 524, as described above in the embodiment, the form in which the second inner tube 524 has the convex portion (not shown) at the minus side of the Y-axis and the first inner tube 514 has the concave portion (not shown) at the plus side of the Y-axis and the convex portion and the concave portion have the same polygonal shape and are fitted with the gap is explained, however, the configuration for absorbing the displacement is not limited to that. As below, a modified example of the configuration for absorbing the displacement will be explained.

Figure 10:
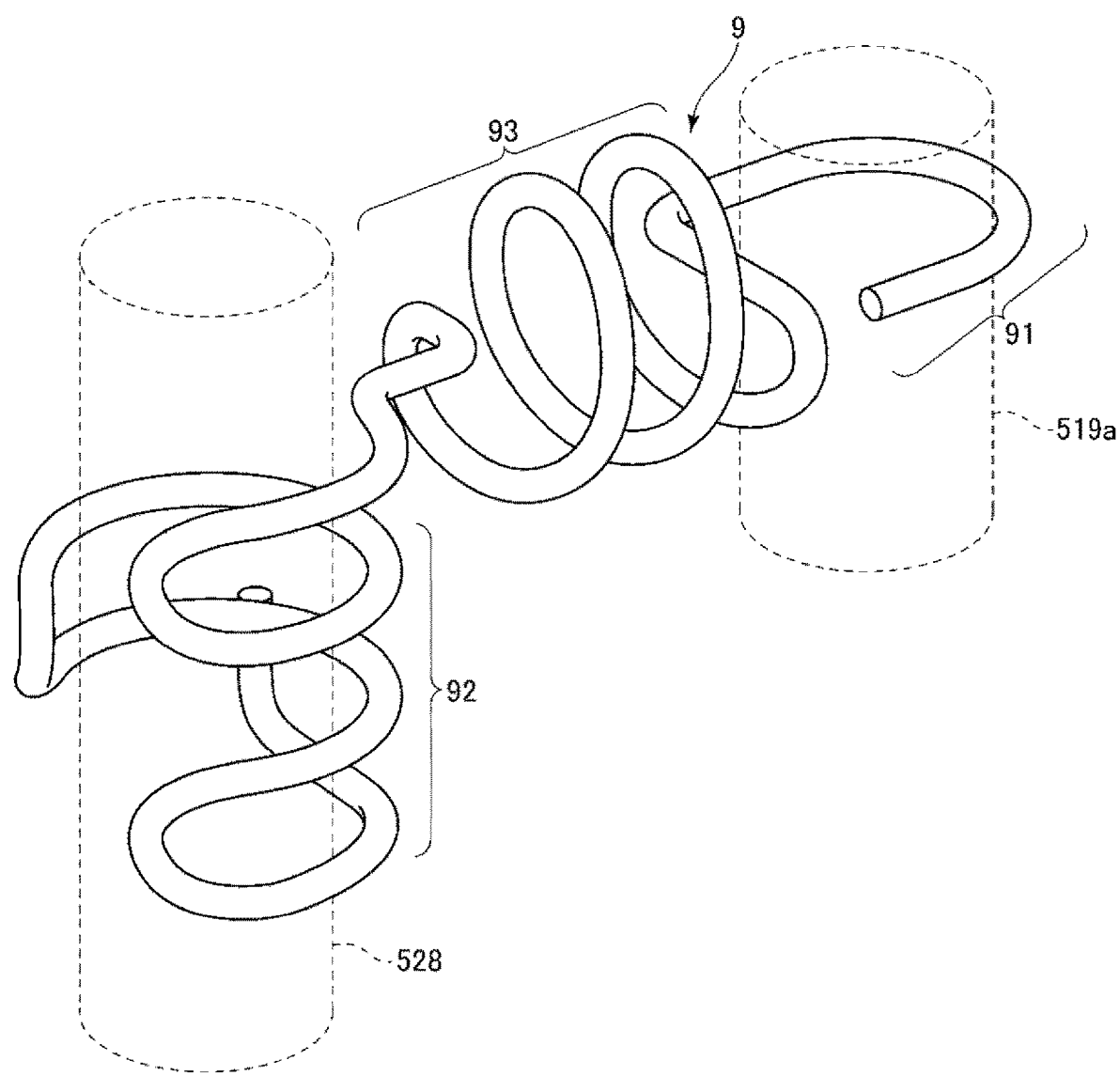
FIG. 10 is a perspective view showing a coupling member coupling an internal pipe and internal wiring.

FIG. 10 is the perspective view showing a coupling member 9 coupling the internal pipe 519a and the internal wiring 528.

The rotary module 5 has the coupling member 9 as shown in FIG. 10. The coupling member 9 couples e.g. the internal pipe 519a provided at the minus side of the Y-axis of the second member 52 and projecting from the second member 52 and the internal wiring 528.

Specifically, the coupling member 9 shown in FIG. 10 includes a first attachment portion 91 attached to the internal pipe 519a, a second attachment portion 92 attached to the internal wiring 528, and an elastic portion 93 coupling between the first attachment portion 91 and the second attachment portion 92 and having elasticity. The coupling member 9 is provided and, when the rotary module 5 is actuated, a binding force may be generated between the internal pipe 519a and the internal wiring 528. Thereby, displacement between the internal pipe 519a and the internal wiring 528 may be suppressed. Particularly, the coupling member 9 includes the elastic portion 93 and, even when displacement occurs, the displacement may be absorbed and removed using the elasticity of the elastic portion 93. As a result, a failure with the displacement may be suppressed.

The coupling member 9 shown in FIG. 10 is formed by shaping of a single metal wire. Specifically, the first attachment portion 91 is formed by a part in which the metal wire is curved to be wound around the outer circumference surface of the internal pipe 519a.

The second attachment portion 92 is formed by a part processed to curve and fold the metal wire to be fitted with the outer circumference surface of the internal wiring 528. Thus processed metal wire has a shape that can be wound around the outer circumference surface of the internal wiring 528 by a half or more in the circumferential direction. Note that the wire is not wound around the entire circumference. Thereby, the second attachment portion 92 can be fitted from the side of the internal wiring 528. That is, the second attachment portion 92 has a function of being attached to or detached from the internal wiring 528. Thereby, the second attachment portion 92 can be attached and detached even in the middle position of the extension of the internal wiring 528. As a result, the easily-handled coupling member 9 may be realized.

The elastic portion 93 is formed by a part in which the metal wire is curved and shaped into a coil shape. The metal wire has the coil shape, and thereby, the elasticity may be provided to the elastic portion 93. Note that the metal wire forming the elastic portion 93 may be shaped in any shape having elasticity. The other shapes than the coil shape include e.g. a corrugated shape and a spiral shape.

The coupling member 9 may contain another material than the metal wire. The material includes a material having elasticity, specifically, rubber, elastomer, or resin.

In FIG. 10, the internal pipe 519a and the internal wiring 528 are coupled by the coupling member 9, however, another coupling member 9 may be prepared for coupling the internal pipe 519b and the internal wiring 528. Or, the coupling member 9 may be configured to couple the internal pipes 519a, 519b and the internal wiring 528.

2. Second Embodiment

Next, the second embodiment will be explained.

Figure 11:
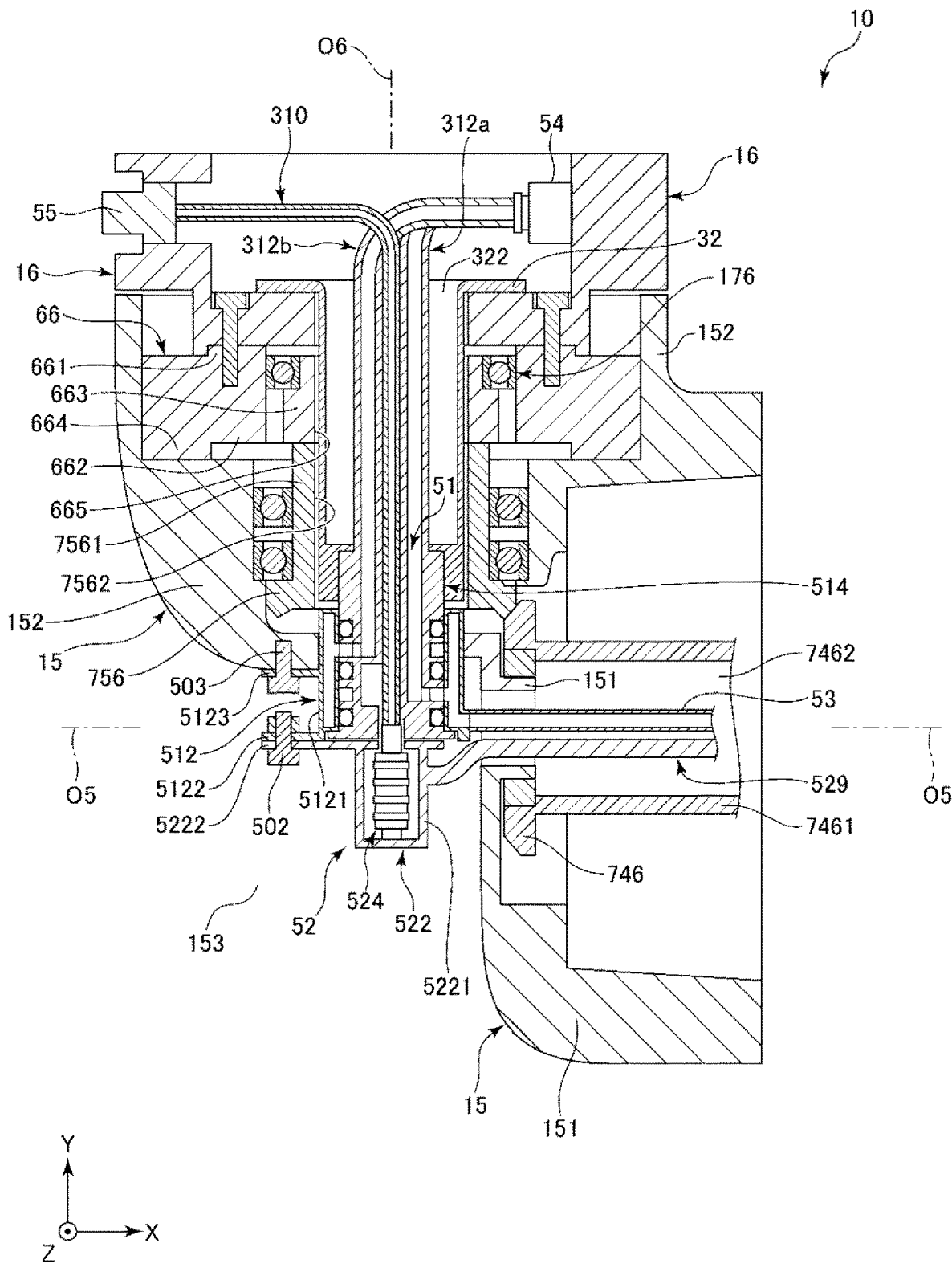
FIG. 11 is a sectional view showing a fifth arm and a sixth arm of a robot according to a second embodiment.
Figure 12:
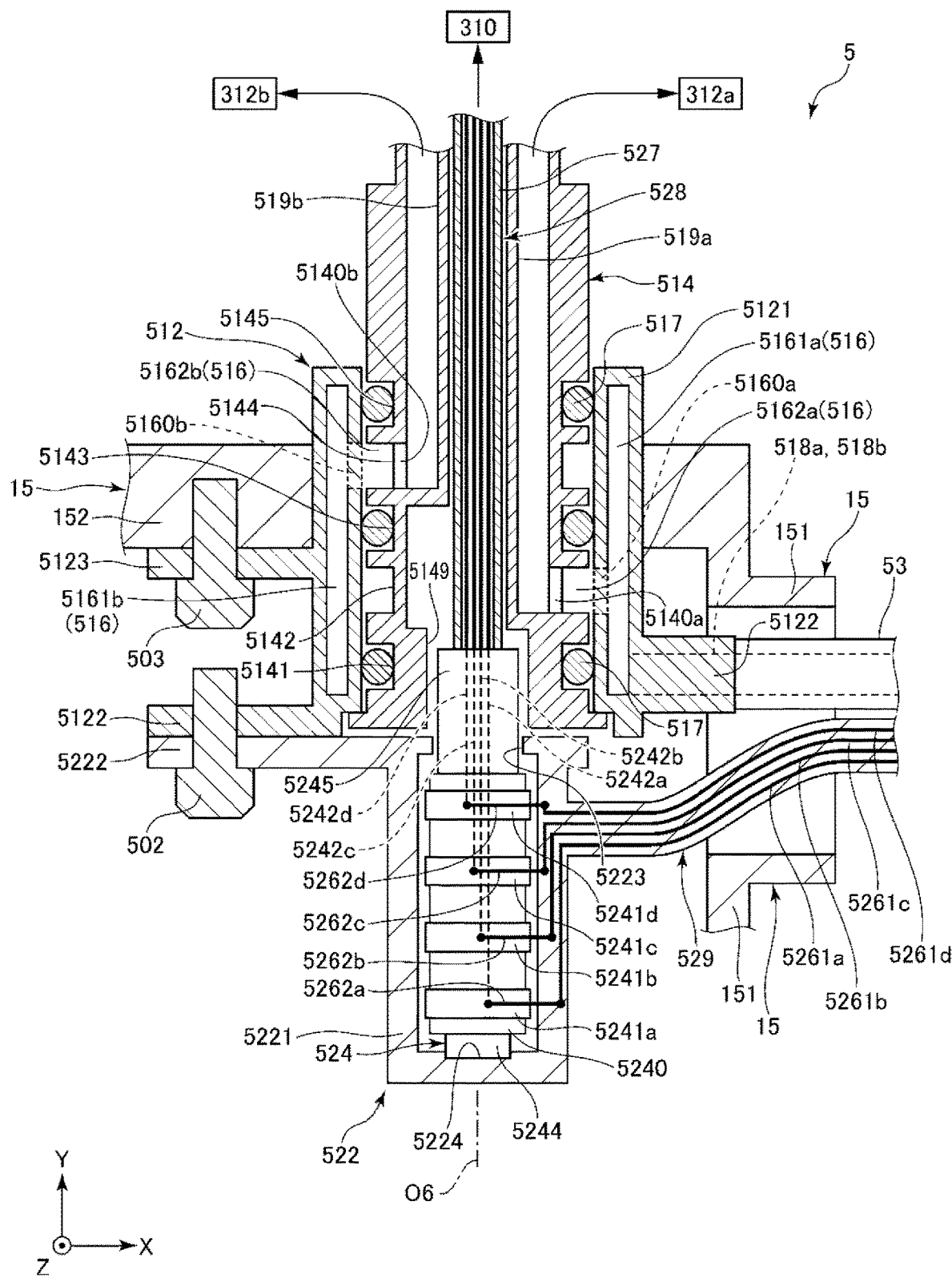
FIG. 12 is a partially enlarged view of FIG. 11.

FIG. 11 is the sectional view showing the fifth arm and the sixth arm of the robot according to the second embodiment. FIG. 12 is the partially enlarged view of FIG. 11. Note that, in FIG. 11, illustration is partially omitted inside of the fifth arm 15.

As below, the second embodiment will be explained. In the following description, the explanation will be made with a focus on differences from the first embodiment and the explanation of the same items will be omitted. Note that, in FIGS. 11 and 12, the same configurations as those of the first embodiment have the same signs.

The second embodiment is the same as the first embodiment except that the placement of the first member 51 and the second member 52 and the behavior of the rotary module 5 are different.

Specifically, in the above described first embodiment, in the rotary module 5, the tubular member 32, the first member 51, and the second member 52 are sequentially arranged from the minus side of the Y-axis toward the plus side of the Y-axis. On the other hand, in the embodiment, reversely to the first embodiment, the tubular member 32, the first member 51, and the second member 52 are sequentially arranged from the plus side of the Y-axis toward the minus side of the Y-axis.

More specifically, in the first embodiment, the tubular member 32 is fixed to the fifth arm 15, however, in the embodiment, the tubular member 32 is fixed to the sixth arm 16. Further, of the first member 51, the end portion of the first inner tube 514 at the plus side of the Y-axis is fitted in the tubular member 32 as shown in FIG. 11.

The first outer tube 512 includes another larger diameter portion 5123 located in the center portion of the length of the smaller diameter portion 5121 along the Y-axis as shown in FIG. 12 in addition to the larger diameter portion 5122 located in the end portion of the smaller diameter portion 5121 at the minus side of the Y-axis.

The larger diameter portion 5222 of the second outer tube 522 of the second member 52 and the larger diameter portion 5122 of the first outer tube 512 of the first member 51 are fixed to each other by a bolt 502 as shown in FIG. 12. On the other hand, the other larger diameter portion 5123 of the first outer tube 512 is fixed to the second portion 152 of the fifth arm 15 by a bolt 503 as shown in FIG. 12.

In the first embodiment, the wire 310 and pipes 312a, 312b are laid between the rotary module 5 and the fifth arm 15 and the proximal end side thereof, however, in the embodiment, laid between the rotary module 5 and the sixth arm 16. Specifically, in the embodiment, as shown in FIG. 11, the pipes 312a, 312b are laid between the rotary module 5 and the joint 54. Further, the wire 310 is laid between the rotary module 5 and the input/output connector 55.

In the first embodiment, the coupling pipe 53 couples the rotary module 5 and the joint 54, however, in the embodiment, the coupling pipe 53 is inserted through the through hole 7462 of the bevel gear 746 and couples between from the rotary module 5 to the fifth arm 15 and the proximal end side thereof.

Further, in the first embodiment, the external coupling portion 529 of the second member 52 is coupled to the input/output connector 55, however, in the embodiment, the external coupling portion 529 is inserted through the through hole 7462 of the bevel gear 746 and extends toward the fifth arm 15 and the proximal end side thereof.

Here, in the first member 51, the first inner tube 514 is rotatable relative to the first outer tube 512. "Rotatable relative to" refers to a state in which the first outer tube 512 is fixed and the first inner tube 514 is rotatable or a state in which the first inner tube 514 is fixed and the first outer tube 512 is rotatable, and the embodiment is the latter state.

Further, in the second member 52, the second inner tube 524 is rotatable relative to the second outer tube 522. "Rotatable relative to" refers to a state in which the second outer tube 522 is fixed and the second inner tube 524 is rotatable or a state in which the second inner tube 524 is fixed and the second outer tube 522 is rotatable, and the embodiment is the latter state.

In the above described second embodiment, when the motor 406M rotates, the rotation is first transmitted to the bevel gear 746 like the first embodiment. The rotation of the bevel gear 746 is transmitted to the sixth arm 16 via the bevel gear 756 and the reducer 66 like the first embodiment. Then, in the embodiment, the rotation of the sixth arm 16 is transmitted to the tubular member 32 fixed to the sixth arm 16. Then, the rotation is respectively transmitted to the first inner tube 514 fitted with the tubular member 32 and the second inner tube 524 fitted with the first inner tube 514. On the other hand, the first outer tube 512 is fixed to the fifth arm 15 and the second outer tube 522 is fixed to the first outer tube 512, and do not rotate. In this manner, the rotary module 5 is actuated.

Note that the method of fixing the first outer tube 512 and the second outer tube 522 to the fifth arm 15 is not limited to the above described method. For example, the first outer tube 512 and the second outer tube 522 may be fixed to the fifth arm 15 by a single bolt. Or, the first outer tube 512 may be fixed to the second outer tube 522, and then, the tubes may be fixed to the fifth arm 15.

As above, the present disclosure is explained based on the illustrated embodiments, however, the present disclosure is not limited to those.

For example, in the robot according to the present disclosure, the number of arms in the robot arm may be two to five, seven, or more. The robot according to the present disclosure is not limited to the single-arm robot, but may be a dual-arm robot. That is, two or more robot arms may be provided on the base.

Further, the installation surface of the robot according to the present disclosure may be e.g. a ceiling, wall, platform, or the like in place of the floor.

In the robot 1 of the above described embodiments, the form in which the first outer tube 512 and the second outer tube 522 of the rotary module 5 are coupled to the sixth arm 16 as the distal end side arm and the first inner tube 514 and the second inner tube 524 are coupled to the fifth arm 15 as the proximal end side arm is shown, however, the form is not limited to that. For example, the first outer tube 512 and the second outer tube 522 of the rotary module 5 may be coupled to the fourth arm 14 and the first inner tube 514 and the second inner tube 524 may be coupled to the third arm 13. In this regard, the fourth arm 14 is the distal end side arm and the third arm 13 is the proximal end side arm. Or, the first outer tube 512 and the second outer tube 522 of the rotary module 5 may be coupled to the first arm 11 and the first inner tube 514 and the second inner tube 524 may be coupled to the base 4. In this regard, the first arm 11 is the distal end side arm and the base 4 is the proximal end side arm. Or, the first outer tube 512 and the second outer tube 522 of the rotary module 5 may be coupled to the second arm 12 and the first inner tube 514 and the second inner tube 524 may be coupled to the first arm 11. In this regard, the second arm 12 is the distal end side arm and the first arm 11 is the proximal end side arm. Or, the first outer tube 512 and the second outer tube 522 of the rotary module 5 may be coupled to the third arm 13 and the first inner tube 514 and the second inner tube 524 may be coupled to the second arm 12. In this regard, the third arm 13 is the distal end side arm and the second arm 12 is the proximal end side arm. Or, the first outer tube 512 and the second outer tube 522 of the rotary module 5 may be coupled to the fifth arm 15 and the first inner tube 514 and the second inner tube 524 may be coupled to the fourth arm 14. In this regard, the fifth arm 15 is the distal end side arm and the fourth arm 14 is the proximal end side arm.

According to the robot 1, the outer diameter of the robot arm 10 may be reduced by the rotary module 5 having the diameter that can be suppressed to be larger. It is not necessary to restrict the rotation angle of the distal end side arm relative to the proximal end side arm without loss of circulation of the air or the like and the electrical coupling. Therefore, the compact and user-friendly robot 1 may be realized.

Further, in the rotary module 5, the example in which the tubular member 32, the first member 51, and the second member 52 are sequentially arranged from the proximal end side toward the distal end side is shown, however, the tubular member 32, the first member 51, and the second member 52 may be sequentially arranged from the distal end side toward the proximal end side.

What is claimed is:

1. A rotary module comprising:
a first outer tube;
a first inner tube provided inside of the first outer tube and rotating relative to the first outer tube;
a channel passing through between the first outer tube and the first inner tube and coupling an outside of the first outer tube and an inside of the first inner tube;
a first member in which a function of the channel is maintained when the first outer tube rotates relative to the first inner tube;
a second outer tube;
a second inner tube provided inside of the second outer tube and rotating relative to the second outer tube;
a first terminal provided on an inner circumference surface of the second outer tube;
a second terminal provided on an outer circumference surface of the second inner tube; and
a second member in which electrical coupling between the first terminal and the second terminal is maintained when the second outer tube rotates relative to the second inner tube, wherein
the first outer tube and the second outer tube are fixed,
the first inner tube and the second inner tube are fixed, and
the first member and the second member are arranged along the same axis as each other.

2. The rotary module according to claim 1, wherein
the second member has internal wiring inserted through the second inner tube, and
the internal wiring and the second terminal are electrically coupled.

3. The rotary module according to claim 2, wherein
the internal wiring is inserted through the first inner tube.

4. The rotary module according to claim 2, wherein
the first member includes an internal pipe inserted through the first inner tube, and
a coupling member including a first attachment portion attached to the internal pipe, a second attachment portion attached to the internal wiring, and an elastic portion coupling the first attachment portion and the second attachment portion and having elasticity, and coupling the internal pipe and the internal wiring is provided.

5. The rotary module according to claim 1, wherein
the first member has a coupling port provided in an outer circumference surface of the first outer tube and coupled to the channel.

6. The rotary module according to claim 1, wherein
the second member has a coupling portion provided in the outer circumference surface of the second outer tube and electrically coupled to the first terminal.

7. The rotary module according to claim 1, wherein
the first member includes an internal pipe inserted through the first inner tube, and
the internal pipe and the channel are coupled.

8. A robot comprising:
the rotary module according to claim 1; and
a robot arm including a proximal end side arm and a distal end side arm coupled to a distal end side of the proximal end side arm, wherein the distal end side arm is coupled to the first outer tube and the second outer tube, and the proximal end side arm is coupled to the first inner tube and the second inner tube.

* * * * *